Oct. 3, 1939.  K. A. MEYER  2,174,801
FAN BLADE WELDING APPARATUS
Filed Dec. 15, 1937  2 Sheets-Sheet 1
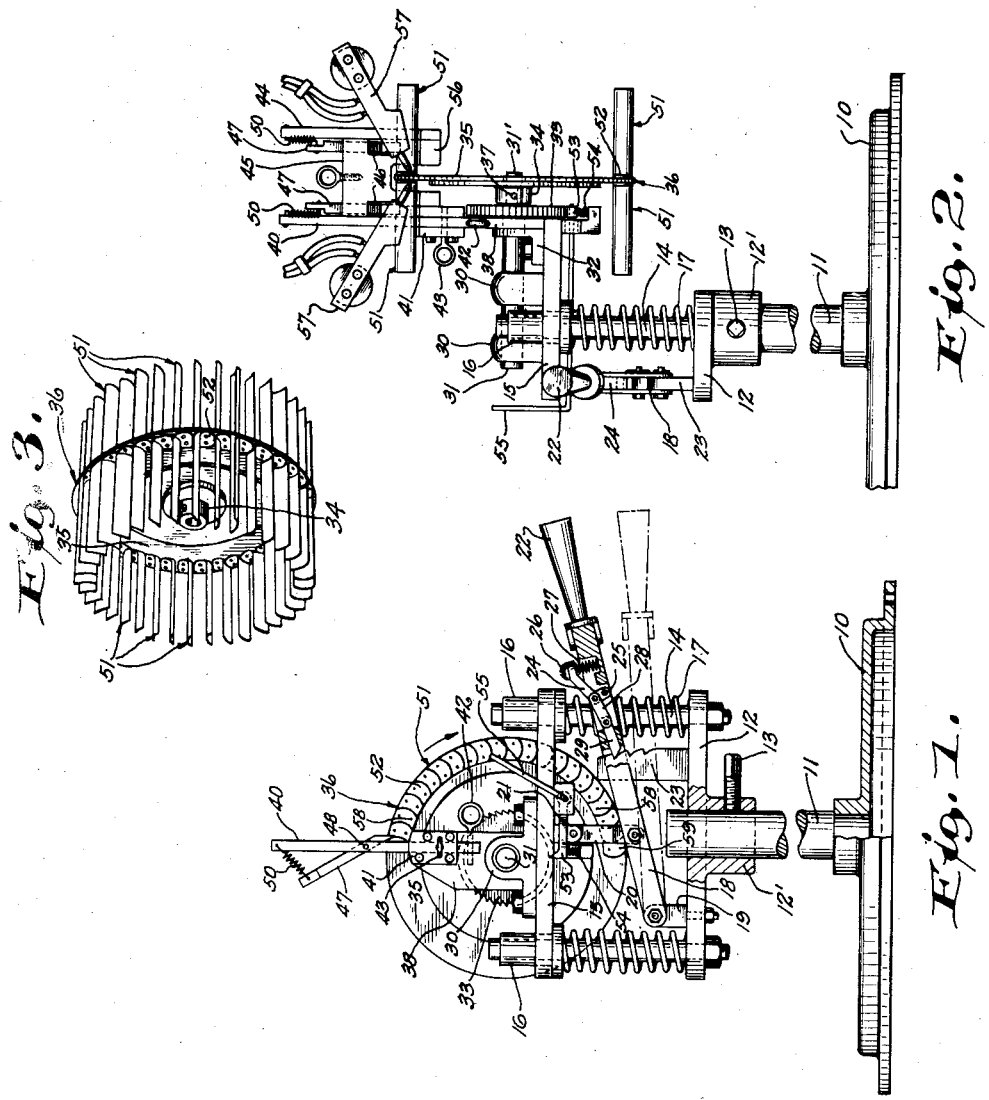
INVENTOR
Karl A. Meyer,
BY Morsell, Lieber & Morsell
ATTORNEYS.

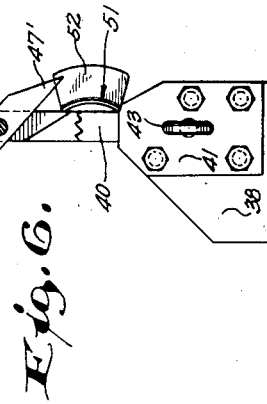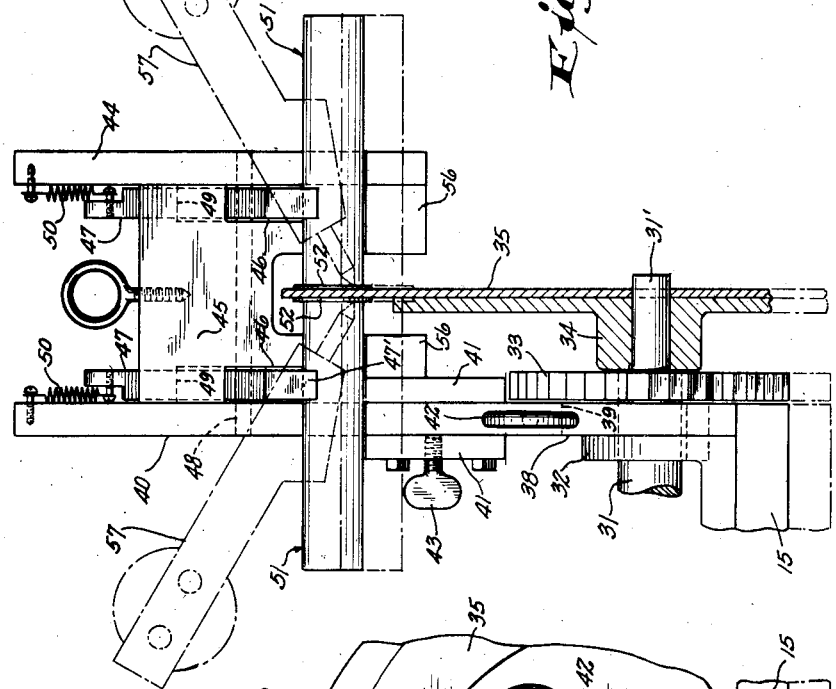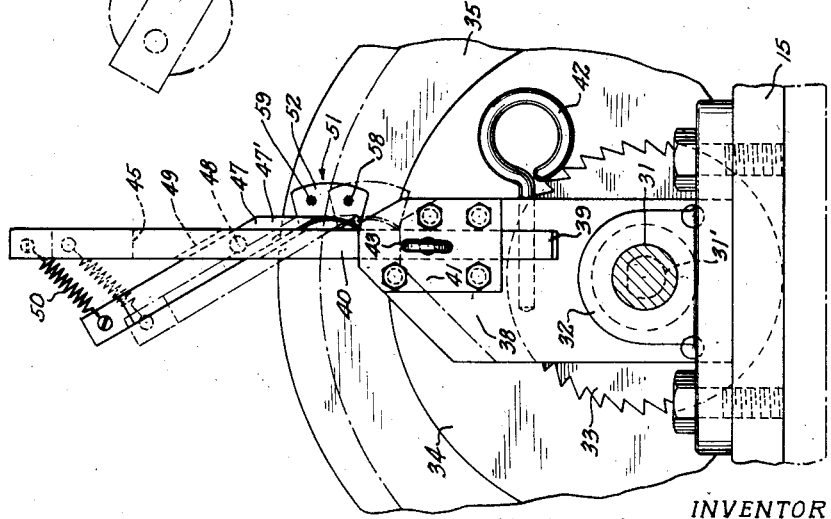

Patented Oct. 3, 1939

2,174,801

UNITED STATES PATENT OFFICE 2,174,801

FAN BLADE WELDING APPARATUS

Karl A. Meyer, Milwaukee, Wis., assignor to L. J. Mueller Furnace Company, Milwaukee, Wis., a corporation of Wisconsin Application December 15, 1937, Serial No. 179,864

10 Claims. (Cl. 219—4)

This invention relates to improvements in fan blade welding apparatus.

In the manufacture or assembly of fans of the multiblade type such as are commonly used in connection with heating, ventilating, and air conditioning apparatus, it is customary to provide a central metallic disc, and the blades or floats are welded, at their inner ends, to peripheral portions of opposite faces of said disc in spaced relation, with one set of blades extending axially from one face of the disc and with the other set of blades alined with the blades of the first set and extending axially from the other face of the disc. In these assembly or fabricating operations, means have heretofore been employed for movably supporting the disc, but the attention of several operators was required as it was necessary for one or more operators to apply pairs of blades to opposite faces of the disc and so hold them while another operator manipulated and applied the welding tool. Due to this mode of fabrication the work was rather slow and costly and inaccuracies in the positioning, spacing, and pitch of the blades was very apt to occur.

With the foregoing in mind it is, therefore, the primary object of the present invention to overcome said difficulties and objections by providing an apparatus for facilitating expeditious and accurate fan blade welding and assembly, wherein only one operator is required and which will insure correct positioning, spacing, and pitch of the applied blades.

A further object of the invention is to provide an apparatus of the character described which is adjustable, which will quickly engage and release the work, and which can receive interchangeable heads to adapt the apparatus for fans of various sizes.

A further object of the invention is to provide a fan blade welding apparatus which is of very simple construction, is strong and durable, is easy and fast to operate, adjust and manipulate, and is well adapted for the purposes described.

With the above and other objects in view, the invention consists of the improved fan blade welding apparatus and its parts and combinations as set forth in the claims, and all equivalents thereof.

In the accompanying drawings in which the same reference characters indicate the same parts in all of the views:

Fig. 1 is a side view of the improved fan blade welding apparatus, parts being broken away and in section to show structural details;

Fig. 2 is an end view of the apparatus with some of the blades omitted from the fan disc and showing the position of the welding tools;

Fig. 3 is a perspective view of a completed fan of the type operated on by the improved apparatus;

Fig. 4 is an enlarged fragmentary side view of the upper or head portion of the apparatus, parts being in section;

Fig. 5 is an end view of the showing in Fig. 4 with the fan disc in section and with a broken line showing of the welding tools; and Fig. 6 is an enlarged fragmentary view of a blade holding arm and support.

Referring now more particularly to the drawings, it will appear that the improved apparatus includes an enlarged flat base member 10 from which projects a vertical post 11. Adapted to be adjustably secured on the upper end portion of said post is a lower plate 12 having a central hub or boss 12' through which said post extends, said portion 12' carrying a threaded clamping bolt 13 for releasable impingement against a portion of the post. Extending upwardly from opposite sides of the plate 12 are a pair of guide rods 14 on which an upper plate 15 is vertically movably mounted. Upward movement of said plate 15 relative to the rods 14 is limited by caps or collars 16 surrounding the upper ends of said rods, and downward movement of said plate 15 is yieldingly opposed by coiled springs 17 surrounding the major portions of said rods.

From Figs. 1 and 2 it will be observed that the inner end of a lever 18 is pivotally secured to a protuberance 19 on the lower plate 12. Said lever is for the purpose of manually raising or lowering the upper plate 15, and the medial portion of the lever has pivotally secured thereto one end of a link 20. The other end of said link is pivotally secured to an ear 21 depending from the under side of the upper plate 15. The free end portion of the lever 18 is formed as a handle, as at 22. The major portion of the lever is of bifurcated formation and a notched arm 23 extends freely therethrough, said arm being rigid and extending upwardly from the plate 12.

Within the bifurcated portion of the lever, adjacent the handle 22, there is also mounted releasable pawl mechanism for engaging the serrated arm 23 for the releasable retention of the lever 18 and upper plate 15 in adjusted position. Said pawl mechanism includes a bell crank lever 24 having its inner end pivotally mounted within the lever 18, as at 25. The other end of the bell crank lever projects above and exteriorly of the member 18 and carries a knob 26 for manual engagement, and said end portion of the lever 24 moves against the tension of a confined coiled spring 27. To release the pawl, the outer end of the lever 24 should be moved to the right (relative to Fig. 1) and downwardly, and this will exert a pull on a pivotally attached link 28. The link in turn will pull a pawl 29 to disengage it from a notch of the arm 23, said pawl moving in a slot therefor in the member 18. Release of the bell crank lever, because of the spring 27, will move said parts in the opposite direction and cause the projected end of the pawl 29 to snap into a notch of the arm 23.

The upper surface of the upper plate 15 carries a pair of trunnions 30 in which there is journaled a horizontal shaft 31. There is also on said plate a bearing bracket 32 through which said shaft extends. Fast on the shaft, adjacent the outer face of the bearing bracket, is a relatively large ratchet wheel 33. The number of teeth in said ratchet wheel corresponds with the number of sets of blades with which a fan disc is to be supplied, as will hereinafter appear. The outer extremity of the shaft 31 is reduced, as at 31', and is adapted to have fixedly mounted thereon the hub portion 34 of the central disc 35 which is ultimately formed into a fan of the multiblade type, designated generally by the numeral 36, and as shown in detail in Fig. 3. The disc 35 is removably held onto said shaft portion by a bolt 37.

The numeral 38 indicates a vertical supporting plate for a blade fixture. Said plate is carried by the member 15 between the bracket 32 and the ratchet wheel 33 and is apertured to permit the shaft 31 to extend revolubly therethrough. Extending from the top of said plate 38 downwardly is a vertical slot 39 in which is mounted the depending portion of an elongated fixture arm 40, a portion of said arm being confined in said slot between keeper plates 41 and being removably secured in position by bolts 42 and 43. The blade fixture, besides the upper portion of the arm 40, comprises a second vertical arm 44 and a block 45 secured to and extending between upper portions of said arms. The lower portion of the block has opposite inwardly extending recesses 46 forming slots through which the lower end portions of blade engaging fingers 47 movably project, said fingers being pivotally mounted on a transverse pivot pin 48. Above the recesses 46 the block 45 has its rear face recessed on a taper, as at 49, to allow limited pivotal movement of said fingers. The outer extremities of said fingers are beveled angularly, as at 47'. The upper end portions of the fingers 47 are yieldingly connected to the arms 40 and 44 respectively by coiled springs 50.

In the formation or fabrication of a fan of the type under consideration, it is necessary that sets of blades or floats have their flanged inner end portions welded to peripheral face portions of the fan disc 35. The blades of one set are adapted to extend axially from one face of the disc in one direction, and the blades of the other set are adapted to extend from the other face of the disc axially in the other direction. The blades of each set must be mounted at a desired pitch and in proper spaced relation to one another, and the blades of the other set are alined with the first set.

Referring to the drawings, it will be noted that a blade is indicated generally by the numeral 51, and the major portion of the blade is of convex formation with a flanged inner end 52. The problem in assembly is to position a pair of oppositely extending blades 51 against adjacent opposite face portions of the disc, with the flanged ends 52 in abutment with the face portions of the disc and to weld the applied blades in this position at the proper pitch, and to subsequently position and weld adjacent pairs of blades in proper spaced relation to the already applied blades.

In performing these operations on the improved apparatus the entire blade fixture is initially removed from the apparatus by withdrawing the bolts 42 and 43. Thereupon a disc 35 of the fan 36 is mounted on the reduced projecting end portion 31' of the shaft 31 and is secured thereon by the clamping bolt 37. After mounting of the fan disc the blade fixture may be replaced, and it is then mounted in the relationship shown in the drawings, being positioned and secured by the bolts 42 and 43. As before mentioned the ratchet wheel 33 is fast on the shaft with the disc 35, and this ratchet wheel has the same number of teeth therein as there will be blades in a peripheral series on the disc. The disc is locked against undesired rotation by a pivotally mounted dog 53 which is yieldingly held in tooth engaging position by a confined coiled spring 54. To permit release of the ratchet and turning of the disc 35, as will hereinafter appear, the dog 53 may be pivotally moved to a disengaged position by means of a hand lever 55.

In manipulating the machine only one operator is required, and the operator selects a pair of complementary blades 51 and positions the flanged ends of the same against opposite face portions of the disc 35 near the upper peripheral portion of the same. These blades rest on the upper surfaces of supporting blocks 56 and against the front face portions of the fixture arms 40 and 44. While the blades are being thus positioned, the pivotal fingers 47 are swung in a counterclockwise direction relative to Figs. 1 and 4, and against the tension of the springs 50. Upon placing the pair of blades in the manner described, the fingers 47 are then released and are held under tension so that the beveled or tapered lower ends 47ª of the fingers engage face portions of the blades 51, in the manner shown in Fig. 4, and thereby clamp said blades against the arms 40 and 44.

The next step is the operation to simultaneously weld the flanged ends of both blades to the opposite face portions of the disc 35. It is essential that there be two welding spots for each blade. For the first welding operation it is essential that the upper plate 15 be originally adjusted at the proper elevation, and it is maintained at this elevation by the pawl 29 engaging a selected tooth of the notched plate 23.

A pair of oppositely directed electric welding tools are indicated by the numerals 57. These tools are of conventional form and are fixedly supported in the positions and at the inclinations shown, by suitable means, not forming a part of the present invention. Initially the ends of the tools 57 engage lower portions of the flanged ends 52 of the blades, and when electric current is supplied to the tools, the flanged ends of the blades are spot welded to the disc at the lower points designated 58. Immediately following this welding operation the lever 18 is depressed so as to engage the pawl 29 with a selected lower notch in the plate 23, and this movement serves to lower the upper plate 15 and all of the elements carried thereby, including the disc 35 and the blade support. This movement will bring upper portions of the flanges of the applied blades into alinement with the ends of the welding tools 57, and then a welding operation takes place to form the upper spot welds 59. In this manner a pair of blades are simultaneously welded to adjacent opposite portions of the disc, and the points of spot welding are uniform. The next operation is to apply the next pair of oppositely extending blades. Just prior to this operation the lever 24 is manipulated to release the pawl 29, and the upper plate 15 is raised through the medium of the lever 18 and is then secured in its original upper position. The dog 53 is then manipulated to release the ratchet wheel 33, and the disc 35 is turned in the direction indicated in Fig. 1 a distance of one notch in the ratchet wheel 33, and is then secured in this advanced position. Subsequently the second pair of blades is applied to the disc, and the welding operations are performed in the manner just described, and thereafter this sequence of operations is continued until the entire annular series of blades is applied to the disc. Upon completion of the assembly and welding of the blades to the disc, the blade support is removed and the disc is removed from the shaft 31, and a new disc is applied for blade assembly operations as previously described.

From the foregoing description it will appear that the improved fan blade welding apparatus permits rapid and accurate fabrication of a fan by facilitating the operations wherein the blades are welded to the fan disc. The apparatus minimizes the number of operators required for this work and additionally insures the production of a better fan as the blades are all properly located, are properly spaced and pitched, and the points of spot welding are all uniform. The apparatus may have interchangeable blade supports or heads mounted therein to adapt it for operation on fans of different sizes. It is furthermore obvious that various parts of the apparatus are susceptible of adjustment to adapt the device to positioning the work correctly relative to the tools. The apparatus is furthermore of simple and novel construction and is well adapted for the purposes set forth.

What is claimed as the invention is:

1. An assembly aiding apparatus, comprising means for supporting a primary element of a mechanism, a tool for attaching secondary elements to said primary element and positioned adjacent a predetermined portion of said primary element, releasable means for temporarily clamping a secondary element adjacent a selected portion of the primary element and adjacent said tool, and means for moving the primary element vertically a predetermined distance and arcuately a predetermined distance while it is being supported.

2. An assembly aiding apparatus, comprising means for supporting a primary element of a mechanism, a tool for attaching secondary elements to said primary element and positioned adjacent a predetermined portion of said primary element, releasable means for temporarily clamping a secondary element adjacent a selected portion of the primary element and adjacent said tool, means for reciprocating the primary element while it is being supported to relocate a portion of a secondary element relative to the tool, and means for advancing the primary element arcuately a predetermined distance while it is being supported to remove said secondary element from the tool.

3. An assembly aiding apparatus, comprising means for supporting a primary element of a mechanism, a pair of oppositely directed tools for attaching a pair of oppositely directed and alined secondary elements to selected opposite face portions of the primary element, releasable means for temporarily clamping a pair of secondary elements in alined and oppositely directed relation to selected opposite face portions of the primary element, means for reciprocating the primary element and attached secondary elements relative to said tools for application of said tools to different portions of said secondary elements, and means for thereafter advancing the primary element while it is being supported to remove the applied secondary elements from the zone of said tools.

4. An assembly aiding apparatus, comprising a support, means for removably and revolubly securing a disc to said support, means for releasably locking said disc in a desired rotated position, a tool mounted adjacent the support and extending adjacent a peripheral face portion of the disc, means for temporarily clamping a blade against a peripheral face portion of said disc so that the tool will engage a spot on said blade to effect securement of the blade to the disc, and means for reciprocating the disc to relocate the blade relative to the tool to effect another point of securement as between the blade and the disc.

5. An assembly aiding apparatus, comprising a support, means for removably and revolubly securing a disc to said support, means for releasably locking said disc in a desired rotated position, a tool mounted adjacent the support and extending adjacent a peripheral face portion of the disc, yielding means for temporarily clamping a blade in a desired position relative to a peripheral face portion of said disc so that the tool will operate on one portion of the blade for securement of the blade to the disc, and means for reciprocating the disc to change the disposition of the blade relative to the tool for effecting securement operation of the tool on another portion of the blade.

6. An assembly aiding apparatus, comprising a support, means for removably and revolubly securing a disc to said support, means for releasably locking said disc in a desired rotated position, means for rotatively advancing the disc uniform predetermined distances from said first-mentioned position, a pair of oppositely directed tools extending adjacent opposite peripheral face portions of the disc, yielding finger means for releasably holding a pair of oppositely directed blade elements adjacent opposite face portions of the disc whereby said tools may simultaneously operate on portions of said blades for securing the same to the disc, and means for reciprocating the disc to change the disposition of the blades relative to the tools so that said tools may simultaneously operate on other portions of the blades.

7. In a fan assembling apparatus, the combination of an adjustable support, a shaft rotatably carried thereby for the temporary mounting of a disc element, means for intermittently rotating the shaft and disc, means for locking the shaft and disc in desired positions, and a blade supporting head carried by the support.

8. In a fan assembling apparatus, the combination of an adjustable support, a shaft rotatably carried thereby for the temporary mounting of a disc element, means for intermittently rotating the shaft and disc, means for locking the shaft and disc in desired positions, a head carried by the support, and blade clamping fingers yieldingly carried by said head.

9. In a fan assembling apparatus, the combination of an adjustable support, a shaft rotatably carried thereby for the temporary mounting of a disc element, means controlling intermittent rotative movements of the shaft and disc and locking of the shaft and disc in desired positions, welding tools extending adjacent the apparatus, a head removably carried by the support adjacent the tools, and blade clamping fingers yieldingly carried by said head.

10. In a fan assembling apparatus, the combination of a support, a carriage plate vertically movably mounted on the support, resilient means between the support and the carriage plate, means for securing the carriage plate in a desired position of elevation relative to the support, a shaft journaled on the carriage plate for the temporary rotative mounting of a disc element, means controlling stepped rotative movements of said shaft, a head removably supported on the carriage plate, and clamping fingers yieldingly carried by the head for temporarily holding sets of blade elements against peripheral portions of a disc.

KARL A. MEYER.